March 7, 1944.   R. B. CAMPBELL   2,343,495
SEQUENCE VALVE
Filed Sept. 30, 1941   2 Sheets-Sheet 2
Fig. 2.
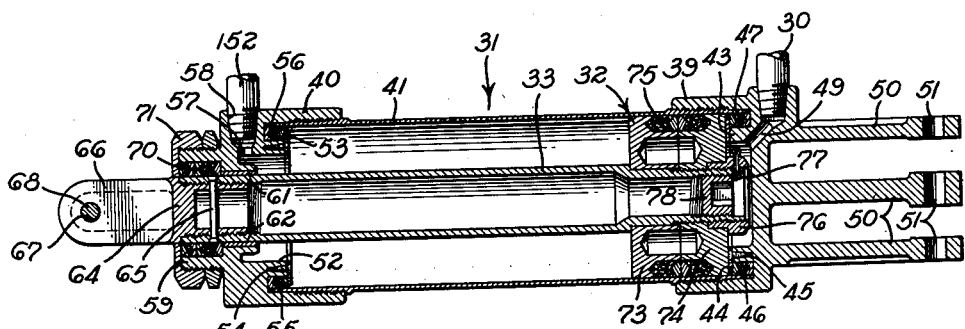
Fig. 3.
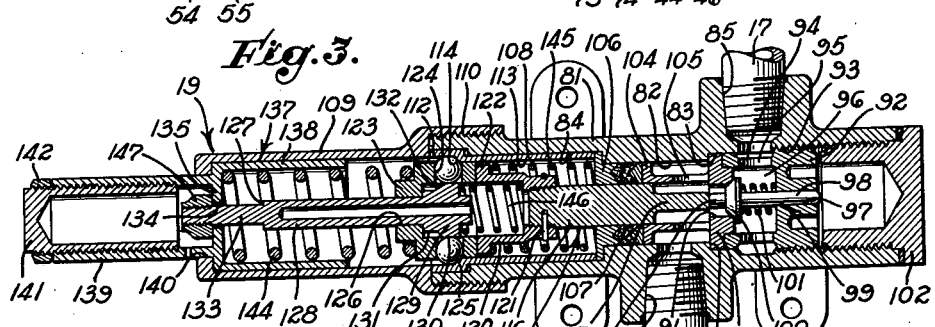
Fig. 4.
INVENTOR
RODNEY B. CAMPBELL
BY HARRIS, KIECH, FOSTER & HARRIS
ATTORNEYS.

Patented Mar. 7, 1944

2,343,495

UNITED STATES PATENT OFFICE 2,343,495

SEQUENCE VALVE

Rodney B. Campbell, North Hollywood, Calif., assignor to John Eley, Jr., Los Angeles, Calif.

Application September 30, 1941, Serial No. 413,074

6 Claims. (Cl. 137—139)

This invention relates to hydraulic control systems, and more particularly to a system including a novel type of locking mechanism therefor adapted to insure proper operation of the system.

My invention is designed for and is particularly applicable for use in an aircraft hydraulic control system and for the purpose of illustration will be described in connection therewith, although it is to be understood that my invention is susceptible of other uses and I do not intend to be limited to the particular embodiment illustrated and described.

It is common practice in the aircraft industry to utilize a high pressure hydraulic system to operate various accessories on an aircraft. For example, it is now standard practice to provide many types of aircraft with a retractable landing gear mechanism by which the landing gear may be retracted during flight but moved to lowered position for landing and take-off. The landing gear is moved between these two operating positions by a suitable mechanical system actuated by a fluid-driven piston operated by the application of fluid under high pressure alternately to the ends of the piston. The hydraulic system includes a high pressure pump adapted to pump operating fluid, such as a special oil, from a reservoir through suitable piping to the equipment to be operated, and includes suitable valves for directing the flow as desired. Furthermore, in most airplanes utilizing a retractable landing gear the fuselage of the plane is equipped with doors which open to permit the landing gear to be extended from the fuselage and which may be closed after the landing gear is retracted into the fuselage, which normally requires separate hydraulic means for opening and closing the doors. The hydraulic means commonly used is another hydraulic cylinder and piston which are hydraulically connected with the high pressure pump through suitable valves.

I have found it desirable, in the use of such an operating system as described, to provide positive locking means for positively locking the landing gear in at least one of its operating positions to insure complete safety in the use of such a hydraulic system with the landing gear. It is therefore a primary object of my invention to provide a hydraulic system for actuating a mechanical device, including locking means for positively locking the mechanical device in one of its positions of operation.

Another object of my invention is to provide such a system in which the locking means may be hydraulically released. I prefer to accomplish this by providing a mechanical locking device engaging the mechanical device to be hydraulically operated, and providing a hydraulically actuated piston communicating with the hydraulic system and operatively connected to the locking means for releasing the same upon the application of fluid pressure to the piston.

Another object of my invention is to provide a control system for a retractable landing gear assembly for an airplane which includes doors in the fuselage of the airplane which are opened to permit the retractable landing gear to be moved to extended position and which are closed after the landing gear is raised to retracted position within the fuselage, the control system including hydraulic means for opening the doors and then moving the landing gear from retracted to extended position in sequence, or moving the landing gear from extended to retracted position and then closing the doors in sequence.

It is also an object of my invention to provide in such a system as described hereinabove automatic sequence control means for controlling the sequence in which the landing gear and the doors are actuated, so as to insure that the doors are fully open before the landing gear is moved from retracted toward extended position, and to insure that movement of the landing gear from extended to retracted position is substantially complete before the doors are closed.

A further object of the invention is to provide such a system, including a novel valve device for preventing the application of pressure fluid to the actuating piston of the landing gear mechanism until such time as the locking means preventing operation of the landing gear mechanism is wholly released.

Still another object of my invention is to provide a novel valve device, which I prefer to term a sequence valve, especially adapted for use in such a hydraulic system as described, and which incorporates a number of novel features of construction and operation which will more fully appear hereinafter.

Another object of my invention is to provide a novel type of hydraulic actuating cylinder including an actuating piston therein adapted to be hydraulically operated.

Other objects and advantages of my invention will appear from the following specification and the drawings, which are for the purpose of illustration only, and in which:

Fig. 2 is a longitudinal sectional view of the novel actuating cylinder of my invention.

Fig. 3 is a longitudinal sectional view of the sequence valve device of my invention, illustrating the device in its closed position of operation.

Fig. 4 is a view similar to Fig. 3 but illustrating the device in its open position of operation.

Figure 1:
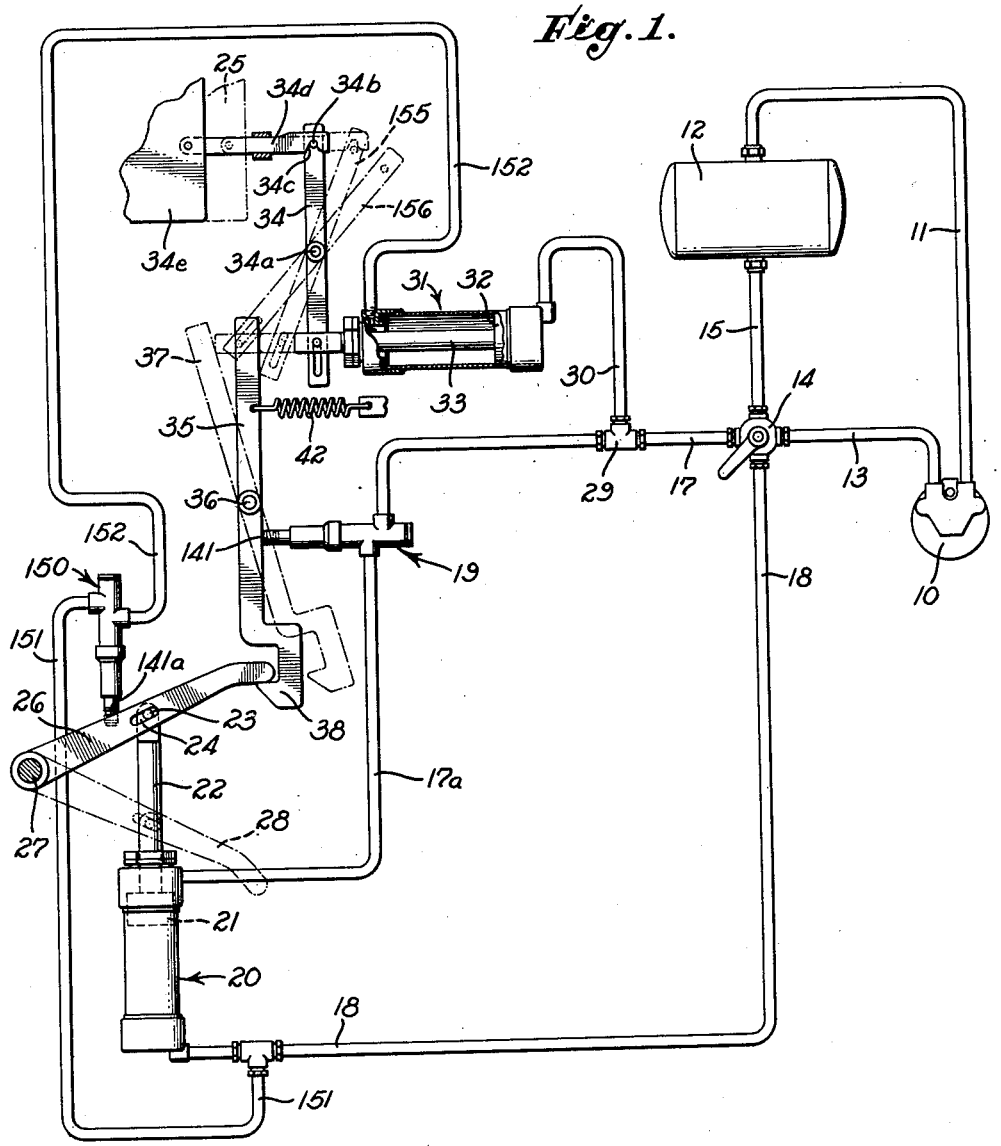
Fig. 1 is a diagrammatic view of a hydraulic system including my invention.

Referring to Fig. 1 of the drawings, I show a pumping means 10 which is preferably a high pressure gear type pump of any type well known in the art, and which constitutes a source of fluid under high pressure for my system. The pump 10 draws such fluid through a pipe 11 from a suitable reservoir 12 and delivers it through a main supply line 13 to a main valve means 14. Also connected to the main valve means 14, which may be any suitable type of two-way valve, is a discharge pipe 15 which is also connected to the reservoir 12. Also connected to the main valve means 14 are a first supply line 17 and a second supply line 18. The first supply line 17 has connected therein a first sequence valve means 19, which will be described in detail hereinafter, and the end of a portion 17a of the first supply line 17 is connected to one end of a first hydraulic cylinder 20, also to be described more fully hereinafter. The other end of the second supply line 18 is suitably connected to the other end of the hydraulic cylinder 20. The hydraulic cylinder 20 contains a piston, diagrammatically indicated by dotted lines 21 in Fig. 1, to which is attached a piston rod 22, the outer end of the piston rod 22 being connected by a pin 23 riding in a slot 24 of a lever arm 26 pivotally mounted on a pivot 27. As will be understood, movement of the piston 21 in the hydraulic cylinder 20 causes movement of the lever arm 26 between the position shown in full lines in Fig. 1 and the position shown in dotted lines 28 therein, and the hydraulic cylinder and the lever arm constitute a device adapted to be actuated by fluid delivered under pressure from the pumping means 10. It will be understood, however, that the pivoted lever arm 26 is merely illustrative of the type of device which may be actuated by the hydraulic cylinder 20, and that any suitable type of device to be actuated may be substituted therefor without the exercise of invention. The lever arm 26 may be suitably coupled to another device to be actuated, such as, for example, a retractable landing gear of an airplane (not shown) of any type well known in the art.

Connected into the first supply line 17 by a T-joint 29 is an auxiliary pipe 30, the other end of which is connected to one end of a second hydraulic cylinder 31, to be described more in detail hereinafter, which includes a piston 32 connected to a piston rod 33 which extends outwardly through the end of the cylinder. Pivotally connected to the outer end of the piston rod 33 is a link arm 34 pivotally mounted on a pivot pin 34a and provided at its upper end with a cross-pin 34b. The cross-pin 34b is adapted to engage in a notch 34c of an actuating rod 34d which is adapted for axial movement and the other end of which is operatively connected to a door mechanism 34e, one corner of which is shown in Fig. 1, so that axial movement of the actuating rod causes a similar movement of the door mechanism.

Aligned with and adapted to be engaged by the end of the piston rod 33 is a pivoted latch arm 35 mounted on a pivot 36 and movable between a latched position shown in full lines in Fig. 1 and an unlatched position indicated by dotted lines 37 of Fig. 1. A coil spring 42 normally retains the latch arm 35 in latched position. The lower end of the latch arm is provided with a hook latch 38 adapted to latch under the free end of the lever arm 26 when the latch arm is in the latched position shown in full lines in Fig. 1, and adapted to be rotated out of engagement with the lever arm 26 when the latch arm is in the unlatched position shown by the dotted lines 37. Rotation of the link arm 34 in a clockwise direction, as seen in Fig. 1, moves the actuating rod 34d and the door 34e from a closed position shown in solid lines in Fig. 1 to an open position shown in dotted lines 25 therein Positioned in the path of movement of the lever arm 26 is a second sequence valve means 150, one side of which is in open fluid communication through a pipe 151 with the second supply line 18, and the other side of which is in open fluid communication through a pipe 152 with the leftward end of the second hydraulic cylinder 31, as seen in Fig. 1. The second sequence valve means 150 is, in all respects, identical with the first sequence valve means 19 and consequently only the construction of the first sequence valve means will be described in detail hereinafter, although the operation of both will be described in the system.

The main valve means 14, as indicated above, is the double two-way type, so that the main supply line 13 may be connected alternatively with either the first or second supply line 17 or 18, and so that when the main supply line 13 is connected with the first supply line 17, the second supply line 18 is connected with the reservoir 12 through the discharge pipe 15, and when the main supply line 13 is connected to the second supply line 18, the first supply line 17 is connected to the reservoir 12 through the discharge pipe 15. Any suitable type of valve well known in the art may be provided for this purpose.

The second hydraulic cylinder 31, as shown in detail in Fig. 2, includes a first end casting 39 and a second end casting 40 connected together by a cylinder 41, the ends of which are threaded into the castings. The first end casting 39 is provided with a circular shoulder 43 therein to which is secured an annular ring plate 44, as by one or more screws 45, which acts as a retainer for an annular packing 46 adapted to form a fluid-tight seal between the end 47 of the cylinder 41 and the first end casting 39. The first end casting 39 is provided with an inlet passage 49, the outer end of which is threaded to receive the end of the auxiliary pipe 30. The first end casting 39 is also provided with a plurality of vertically aligned supporting legs 50 having aligned holes 51 in the outer ends thereof and which may be used to mount the operating cylinder 31 by passing a suitable retaining member through the holes, as will be well understood by those skilled in the art.

The second end casting 40 is similarly provided with a circular shoulder 52 to which is secured an annular ring plate 53, preferably by screws 54, which serves as a retainer for an annular packing 55 which is adapted to form a fluid-tight seal between the end 56 of the cylinder 41 and the second end casting 40. The second end casting 40 is provided with an exhaust port 57, the outer end of which is provided with threads 58 to receive the end of the pipe 152, and is also provided with a tubular extension 59 which is externally threaded.

The second end casting 40 is provided with an axial bore 61 which has an annular bushing 62 secured therein through which extends the piston rod 33 which is hollow. The outer end of the hollow piston rod 33 is closed by a plug 64 threaded into the piston rod and rigidly secured therein by a cross pin 65, the outer end of the plug being provided with clevis arms 66 having aligned holes 67 therein adapted to receive a pivot pin 68 for securing the clevis arms to the upper end of the pivoted latch member 35, as shown in Fig. 1. Adapted to form a fluid-tight seal between the second end casting 40 and the piston rod 33 is an annular packing 70 retained in the tubular extension 59 by a packing gland 71 threaded onto the tubular extension.

Mounted on the inner end of the piston rod 33 is the piston 32 which is formed in two halves 73 and 74, the half 74 being threaded upon the inner end of the piston rod so as to clamp between the halves an annular cheveron-type packing 75 so as to form a fluid seal between the piston and the inner wall of the cylinder 41. The half 74 of the piston 32 is held against movement by a lock nut 76 which is also threaded on the inner end of the piston rod 33 and which is locked in position by a cotter pin 77 passing through the lock nut and the piston rod. The interior of the inner end of the piston rod 33 is provided with an inner end plug 78 which closes the inner end thereof. I prefer to use the hollow piston rod construction shown and described for aircraft use, as it materially reduces the weight of the operating cylinder assembly, although it is to be understood that a solid piston rod may be substituted for the hollow piston rod 33 without departing from the spirit of my invention. The first hydraulic cylinder 20 is identical in construction with the second hydraulic cylinder 31 and, consequently, will not be described in structural detail.

The first sequence valve means 19, shown in detail in Figs. 3 and 4, includes a main housing 81 having a central bore 82 therethrough formed with a counterbore 83 at one end thereof and an enlarged counterbore 84 at the other end thereof. Formed in the main housing 81 is a threaded inlet port 85 which communicates with the counterbore 83, and a threaded discharge port 86 which communicates with the central bore 82. The inlet port 85 is adapted to threadedly receive the end of the first supply line 17, and the discharge port 86 is adapted to threadedly receive the end of the portion 17a of the first supply line. The juncture of the central bore 82 and the counterbore 83 forms an annular, outwardly facing shoulder 89 against which seats an annular valve seat 90 having a central valve opening 91 therethrough, the valve seat being retained in position by a valve retaining member 92 threaded into the outer threaded portion 93 of the counterbore 83. The valve retaining member 92 is provided with an annular channel 94 around its periphery which communicates through drilled holes 95, which are radially disposed, with a central chamber 96 formed therein. The valve retaining member 92 is provided with a bore 97 which is axially aligned with the central valve opening 91, and which receives the shank 98 of a movable valve member 99 having a valve head 100 adapted to seat on the annular valve seat 90. The movable member 99 is normally held in seated position, shown in Fig. 3, by a valve member spring 101. The outer end of the counterbore 83 is closed by a plug 102 threaded thereinto.

Engaging the annular valve seat 90 is a spacer sleeve 104 provided with radial openings 105, the other end of the sleeve engaging a sleeve packing member 106 which includes an annular chevron packing 107. The sleeve packing member is in turn engaged by the inner end of a sleeve element 108, the outer end of which is engaged by a sleeve housing 109 which is threaded onto threads 110 formed on the main housing 81. The sleeve element 108 is formed with a major bore 112 and a minor bore 113 of less diameter and connected with the major bore by an annular beveled cam shoulder 114.

Slidably journaled in the sleeve packing member 106 is a plunger means 115 which is axially aligned with the movable valve member 99 and includes a plunger 116 having a stem 117 formed thereon and adapted to engage an engaging stem 118 formed on the valve head 100 and projecting into the central valve opening 91. Threaded onto the other end of the plunger 116 is a cup-shaped member 120 which is rigidly secured thereto by a set pin 121 and which is provided with an annular end flange 122. Engaging the end face of the end flange 122 is a cup-shaped anvil member 123 provided with a plurality of circumferentially spaced radial ports 124 in each of which is provided a ball member 125, preferably formed of steel. Each ball member 125 is of slightly less diameter than the diameter of the radial ports 124 so as to permit the ball members to move radially relative to the radial ports with a minimum of clearance therebetween. As will be noted from Fig. 3, the ball members 125 are adapted to engage the cam shoulder 114 as shown therein. The cup-shaped anvil member 123 is provided with a longitudinal bore 126 in which is slidably supported a plunger rod member 128. The inner end of the plunger rod member 128 is provided with a locking head 129 having a cylindrical portion 130 of only slightly less diameter than the internal diameter of the anvil member 123. Formed in the rear portion of the locking head 129 is an annular channel 131 of reduced diameter which is connected to the cylindrical portion 130 by an annular beveled face 132. The outer end of the plunger rod member 128 is provided with a stem 133 which extends through an opening 134 formed in a web 135 of an actuating sleeve 137 having a major portion slidably supported in the sleeve housing 109 and having a minor portion 139 of smaller diameter projecting outwardly through an axial opening 140 formed in the sleeve housing 109. Threaded into the outer end of the minor portion 139 of the actuating sleeve 137 is a contact plug 141 which closes the outer end of the sleeve and which is preferably held in fixed axial position relative thereto by a lock nut 142. The plunger rod member 128, with its beveled face 132, the ball members 125, and the cam shoulder 114 all contribute to form a locking means for preventing or restraining rightward movement of the anvil member 123, as described more in detail hereinafter.

Disposed in the sleeve housing 109 is a main compression spring 144, constituting the main spring means of my invention, one end of which engages the web 135 and the other end of which engages the anvil member 123. Similarly disposed in the minor bore 113 of the sleeve element 108 is an auxiliary compression spring 145, one end of which engages the end flange 122 of the cup-shaped member 120 and the other end of which engages the sleeve packing member 106, and this compression spring constitutes an auxiliary spring means of the invention. The auxiliary compression spring 145 is initially set under tension so as to normally urge the cup-shaped member 120 to the left, as seen in Fig. 3, to the position shown therein. Disposed within the cup-shaped member 120 is a third spring 146, which is normally under compression, and which engages the locking head 129 and the cup-shaped member, tending to maintain the plunger rod member 128 in its leftward position as shown in Fig. 3. Threaded on the outer end of the stem 133 of the plunger rod member 128 is a limiting nut 147 for limiting rightward movement of the plunger rod member relative to the actuating sleeve 137, as seen in Fig. 3. The second sequence valve means 150 is identical in construction with the first sequence valve means 19, and consequently, the structural details thereof will not be specifically described.

In Fig. 1, a device to be actuated, in this case the lever arm 26, is in a first position of operation as shown in full lines therein. This position may correspond with the retracted position of the landing gear of an aircraft to which the lever arm 26 is suitably connected as is well known in the art. The pivoted latch arm 35 normally retains the lever arm 26 in this position due to the fact that the latch arm is normally in the position shown in full lines in Fig. 1, in which the hook latch 38 engages beneath the lever arm to prevent its downward movement to the position shown in dotted lines 28. Consequently, when it is desired to move the lever arm 26 from the position shown in full lines to the position shown in dotted lines 28 of Fig. 1, it is first necessary to rotate the pivoted latch arm 35 from its full line position to the position shown by the dotted lines 37 of Fig. 1, in which the lever arm 26 is free to rotate downwardly to its dotted line position. Downward movement of the lever arm 26 from the full time position to the dotted line position 28 as shown in Fig. 1 is accomplished by supplying operating fluid under relatively high pressure from the portion 17a of the first supply line 17 to the upper end of the first hydraulic cylinder 20, which operates on the piston 21 to move the piston, the piston rod 22 and the lever arm 26 connected thereto downwardly. In systems heretofore used in the art, it has been possible to supply operating fluid to the position of the hydraulic cylinder before the latching means, comprised of the latching arm 35 in the present disclosure, is moved to unlatched position. Since the operating pressure of the operating fluid normally supplied by the pump 10 is at high pressure, in the neighborhood of 1000 pounds per square inch, if this fluid pressure is applied to the piston 21 before the latching arm 35 is moved to unlatched position, a serious strain is put upon the actuating mechanism tending to cause breakage. Consequently, in such a system, I provide the first sequence valve means 19 to prevent the possibility of operating fluid being supplied to the hydraulic cylinder 20 before the latch arm 35 is rotated to unlatched position, and this is a primary feature of my invention.

As pointed out hereinabove, where a retractable landing gear is used in an aircraft and is made to be retracted into a suitable opening in the fuselage of the plane, doors, such as the door 34e, are ordinarily provided which are adapted to be closed when the retractable landing gear is retracted and opened when the landing gear is extended. Obviously, it is necessary that the doors be opened before the landing gear is extended and closed only after the landing gear is retracted and that some means be provided for safeguarding the mechanism against the possibility of the door-actuating mechanism being operated out of its desired sequence. This is accomplished by my invention since the second sequence valve means 150 prevents the door 34e from closing before the lever arm 26 has completed its movement from the position shown in dotted lines 28 to the position shown in full lines in Fig. 1, and the clearance between the leftward end of the piston rod 33 of the second hydraulic cylinder 31 and the latch arm 35 permits the lever arm 26 to be moved to the dotted line position 28 only after the door 34e has opened, all as will be described in more detail hereinafter.

In operation, when it is desired to move the lever arm 26 from the position in full lines in Fig. 1 to the position shown in dotted lines 28 thereof, the main valve means 14 is adjusted so as to connect the first supply line 17 with the main supply line 13 and so as to connect the second supply line 18 with the discharge pipe 15. Operating fluid under high pressure is then supplied by the pumping means 10 through the main supply line 13, the main valve means 14, the first supply line 17, the T-joint 29, to the first sequence valve means 19. The parts of the sequence valve means 19 are normally in the position shown in Fig. 3, in which, it will be noted, the movable valve member 99 is in its seated position on the annular valve seat 90. Consequently, operating fluid cannot flow through the first sequence valve means 19 to the portion 17a of the first supply line 17 and to the first hydraulic cylinder 20 until the movable valve member 99 has been moved to its unseated position. Operating fluid, however, flows through the auxiliary pipe 30 to the rightward end of the second hydraulic cylinder 31, entering the same through the inlet passage 49 to exert the full pressure of the operating fluid on the piston 32, causing it to move to the left from the position shown in Fig. 2. Leftward movement of the piston rod 33 from the position shown in full lines in Fig. 1 toward the position thereof shown in dotted lines therein rotates the link arm 34 in a clockwise direction, which, due to the engagement of the cross-pin 34b in the notch 34c of the actuating rod 34d, moves the actuating rod and the door 34e connected thereto to the right to the position thereof indicated by dotted lines 25. When the link arm 34 has rotated to the position indicated by dotted lines 155 the cross-pin 34b clears the edge of the notch 34c and at the same time the leftward end of the piston rod 33 engages the upper end of the latch arm 35. When the door 34e has been moved to the position indicated by dotted lines 25 the door has opened sufficiently to permit the retractable landing gear (not shown) which is operated by the lever arm 26 to move through the opening provided by such movement of the door and, consequently, the door remains in this position on this cycle of operation. However, continued leftward movement of the piston rod 33 continues to rotate the link arm 34 in a clockwise direction to the position indicated by dotted lines 156, but since the cross-pin 34b has cleared the edge of the notch 34c, the actuating rod 34d, and the door 34e remain in the position indicated by dotted lines 25.

After the piston rod 33 engages the upper end of the latch arm 35, continued leftward movement of the piston rod 33 rotates the latch arm 35 about its pivot 36 in a counterclockwise direction from the position shown in full lines in Fig. 1 to the position shown in dotted lines 37 thereof, i. e., from latched to unlatched position. During the leftward movement of the piston 32, any fluid ahead of it may be discharged from the cylinder 41 through the exhaust port 57 into the pipe 152. As will be noted from Fig. 1, when the latch arm 35 is in its latched position, it is vertical and just engages the contact plug 141 of the first sequence valve means 19, in which position the parts of the sequence valve means are as shown in Fig. 3. As the latch arm 35 rotates in a counterclockwise direction about the pivot 36 toward the unlatched position indicated by dotted lines 37 of Fig. 1, the engagement of the latch arm with the contact plug 141 causes the actuating sleeve 137 of the first sequence valve means 19 to move to the right from the position shown in Fig. 3 toward the position thereof shown in Fig. 4.

As the actuating sleeve 137 of the first sequence valve means 19 moves to the right from the position shown in Fig. 3, it compresses the main compression spring 144, which previously had been substantially uncompressed. As this rightward movement of the actuating sleeve continues, the web 135 engages the shoulder 127, and continued rightward movement of the actuating sleeve causes the plunger rod member 128 to move similarly to the right from the position shown in Fig. 3 to the position shown in Fig. 4. During this movement the main compression spring 144 is further compressed. As the locking head 129 approaches the position shown in Fig. 4, the cylindrical portion 130 thereof moves out of engagement with the ball members 125 and brings the annular channel 131 thereof opposite to the ball members. Due to its compressed state, the main compression spring 144 exerts a strong force on the anvil member 123, tending to move it to the right, and since the ball members 125 engage the cam shoulder 114, as soon as the annular channel 131 of the locking head 129 is positioned opposite to the ball members, the rightwardly directed force exerted by the anvil member 123 on the ball members causes them to ride downwardly from the position shown in Fig. 3 to the position shown in Fig. 4, in which they are wholly out of engagement with the cam shoulder. As soon as this occurs, the anvil member 123 is free to move to the right to the position shown in Fig. 4 under the action of the highly compressed main compression spring 144, which it does with a snap action. Rightward movement of the anvil member 123, however, is conveyed through the cup-shaped member 120 to the plunger 116, and the stem 116 thereof through engagement with the movable valve member 99 causes the latter to move to its unseated position as shown in Fig. 4 against the action of the valve member spring 101.

It will thus be understood that during this operation of the first sequence valve means 19, the main compression spring 144 is compressed to its maximum compression prior to the release of the ball members 125, and that the force exerted by the main compression spring is then applied fully to move the movable valve member 99 off of its annular seat 90 to its unseated position with a snap action. As soon as this occurs, operating fluid can then flow from the main portion of the first supply line 17 through the central valve opening 91 and outwardly through the radial openings 105 and the discharge port 86 into the portion 17a of the supply line 17, through which it flows to the upper end of the first hydraulic cylinder 20 to move the piston 21 therein downwardly so as to move the lever arm 26 downwardly to the dotted line position 28. It will thus be understood that operating fluid cannot flow through the first sequence valve means 19 from the supply line 17 to the portion 17a thereof until the movable valve member 99 is in its unseated position, at which time the pivoted latch arm 35 has been rotated to its unlatched position shown in the dotted lines 37 in Fig. 1 and full lines in Fig. 4. As will be appreciated, during downward movement of the piston 21 in the first hydraulic cylinder 20 any fluid trapped ahead of the piston can be discharged through the second supply line 18 and the main valve means 14 and the discharge pipe 15, to the reservoir 12, which is normally kept at relatively low fluid pressure. When the lever arm 26 has moved downwardly to the position indicated by dotted lines 28, this position may correspond to the extended position of the retractable landing gear to which the lever arm is adapted to be connected.

When the piston 21 of the first hydraulic cylinder 20 has moved downwardly to the end of its stroke, the main valve means 14 may be adjusted so as to connect the main supply line 13 with the second supply line 18 and so as to connect the first supply line 17 with the discharge pipe 15. As soon as this occurs, operating fluid under high pressure is conducted through the second supply line 18 to the lower end of the first hydraulic cylinder 20 to move the piston 21 and the lever arm 26 upwardly from the position shown in dotted lines 28 to the position shown in full lines in Fig. 1. When operating fluid is admitted to the second supply line 18 it also flows through the pipe 151 to the second sequence valve means 150 which, when the lever arm 26 is in its dotted line position 28, is closed, the parts of the second sequence valve means corresponding to the position shown in Fig. 3. Just prior to completion of the upward movement of the lever arm from its dotted line position 28 to its position shown in full lines in Fig. 1, the lever arm engages a contact plug 141a of the second sequence valve means 150, which is identical with the contact plug 141 of the first sequence valve means 19. Continued upward movement of the lever arm 26 moves the contact plug 141a upwardly to open the second sequence valve means 150, moving the parts thereof to positions corresponding to the positions shown in Fig. 4, as described above in connection with the operation of the first sequence valve means 19. Operating fluid under pressure then flows from the pipe 151 through the second sequence valve means 150 and through the pipe 152 into the leftward end of the second hydraulic cylinder 31, moving the piston 32 to the right to the position shown in Figs. 1 and 2. Rightward movement of the piston 32 and the piston rod 33 rotates the link arm 34 in a counterclockwise direction from the dotted line position 156 to its full line position as shown in Fig. 1. As will be understood, during such a counterclockwise rotation of the link arm 34 when it reaches the dotted line position 155 the crosspin 34b engages in the notch 34c of the actuating rod 34d, and continued counterclockwise rotation of the link arm 34 moves the actuating rod and the door 34e connected thereto from their dotted line position 25 to the left to the position thereof shown in full lines in Fig. 1, thus closing the door 34e. As will also be understood, since the second sequence valve means 150 is not opened until the lever arm 26 has substantially completed its retraction stroke, operating fluid cannot flow to the leftward end of the second hydraulic cylinder 31 to close the door 34e until the lever arm and the retractable landing gear to which it is adapted to be connected have been moved to retracted position.

Also, as soon as the main valve means 14 is adjusted to connect the first supply line 17 with the discharge pipe 15, the fluid pressure in the first supply line 17 is reduced to that of the fluid pressure in the reservoir 12. This permits the spring 42 to assist the return of the link arm 34 to the full line position by rotating the latch arm 35 back to the full line position, as shown in Fig. 1, in which it is resiliently held by the compression spring 42. This normally occurs before the lever arm 26 has completed its upward movement, but when the lever arm 26 engages the hook latch 38 it can readily move the latch arm 35 out of its path of movement and complete its upward stroke. As soon as the lever arm 26 passes above the hook latch 38, the latch arm 35 is again rotated to its latched position shown in Fig. 1 by the spring 42.

As will be understood, as soon as the latch arm 35 rotates back to its latched position as shown in Fig. 1, the main compression spring 144 of the first sequence valve means 19 expands to move the actuating sleeve 137 back to the position shown in Fig. 3. This substantially reduces the compression on the compression spring 144 and permits the auxiliary compression spring 145, which has theretofore been somewhat compressed to expand, moving the plunger 116 and the anvil member 123 back to the position shown in Fig. 3, which also permits the valve member spring 101 to move the valve member 99 back to its seated position as shown in Fig. 3. During this movement, the beveled face 132 of the locking head 129 moves the balls 125 outwardly in the radial ports 124 to their original position shown in Fig. 3. As the piston 21 in the first hydraulic cylinder 20 moves upwardly, any fluid trapped ahead of the piston can be discharged through the portion 17a of the first supply line 17 and through the first sequence valve means 19 in which it forces the valve member 99 off of the annular seat 98, through the first supply line 17, the main valve means 14, and the discharge pipe 15 back into the reservoir 12. This completes one cycle of the operation of the device.

In describing my invention, and particularly the operating system shown in Fig. 1, I have described it in connection with its preferred use in an airplane having a retractable landing gear and doors for covering the opening into which the landing gear is retracted in the fuselage of an airplane. Such retractable landing gear and doors are standard equipment on airplanes and consequently are neither shown or described in detail since from the foregoing description the application of my control system thereto will be clear to a person skilled in the art. As indicated, however, my hydraulic control system is adapted for use in controlling a sequence of operations with other types of equipment, and I do not desire to be limited to the preferred embodiment described.

Although I have shown and described a preferred embodiment of my invention, it is to be understood that certain parts and elements thereof may be replaced by other parts and elements having the same function and method of operation without departing from the spirit of my invention, and therefore I do not intend to be limited to the particular embodiments and application illustrated but desire to be afforded the full scope of the following claims.

I claim as my invention:

1. In a valve device, the combination of: a valve housing having an inlet port and a discharge port connected by a fluid passage including a valve seat; a valve member movable between a position in which it is seated on said valve seat and an unseated position; valve operating means in said housing adapted to engage said valve member, said operating means being movable from a retracted position to an operating position in which it has moved said valve member to said unseated position; locking means carried by said valve operating means and adapted to normally engage said housing to restrain said valve operating means in said retracted position but releasable from said housing to permit said movement of said valve operating means to operating position, said locking means including a radially movable ball member; spring means engaging said valve operating means; actuating means engaging said spring means and movable to compress said spring means, said actuating means releasing said locking means when said spring means is compressed to permit said spring means to expand to move said valve operating means from said retracted position to said operating position; and auxiliary spring means engaging said valve operating means and operable to return said valve operating means from said operating position to said retracted position.

2. In a valve device, the combination of: a valve housing having an inlet port and a discharge port connected by a fluid passage including a valve seat; a valve member movable between a position in which it is seated on said valve seat and an unseated position; valve operating means in said housing adapted to engage said valve member, said operating means being movable from a retracted position to an operating position in which it has moved said valve member to said unseated position; locking means including a radially movable ball member adapted to normally engage said housing to restrain said valve operating means in said retracted position but releasable from said housing to permit said movement of said valve operating means to operating position; spring means engaging said valve operating means; actuating means engaging said spring means and movable to compress said spring means, said actuating means releasing said ball member of said locking means from engagement with said housing when said spring means is compressed to permit said spring means to expand to move said valve operating means from said retracted position to said operating position; means engaging said valve operating means and operable to return said valve operating means from said operating position to said retracted position; and means for automatically resetting said locking means when said valve operating means returns to said retracted position.

3. In a valve device, the combination of: a valve housing having an inlet port and a discharge port connected by a fluid passage including a valve seat; a valve member movable between a position in which it is seated on said valve seat and an unseated position; valve operating means in said housing adapted to engage said valve member, said operating means being movable from a retracted position to an operating position in which it has moved said valve member to said unseated position; locking means including a radially movable ball member adapted to normally engage said housing to restrain said valve operating means in said retracted position but releasable from said housing to permit said movement of said valve operating means to operating position; spring means engaging said valve operating means; actuating means engaging said spring means and movable to compress said spring means, said actuating means releasing said ball member of said locking means when said spring means is compressed to permit said spring means to expand to move said valve operating means from said retracted position to said operating position; and spring means normally tending to move said valve member to said seated position on said valve seat.

4. In a valve device, the combination of: a valve housing having a longitudinal bore therein and having a valve seat axially aligned with said bore, said housing having an inlet port communicating with said bore on one side of said valve seat and a discharge port communicating with said bore on the other side of said valve seat, and having a shoulder therein; a valve member axially movable in said bore from a seated position on said valve seat preventing fluid flow from said inlet port to said discharge port to an unseated position permitting fluid flow from said inlet port to said discharge port; plunger means axially movable in said bore to engage said valve member, said plunger means being movable from a retracted position in which said valve member is in said seated position to an operating position in which it has moved said valve member to said unseated position; releasable locking means including a ball member engaging said shoulder for normally retaining said plunger means in said retracted position; spring means engaging said plunger means whereby compression of said spring means exerts a force on said plunger means tending to move it from said retracted position to said operating position; means for compressing said spring means; and means for releasing said ball member from engagement with said shoulder when said spring is compressed.

5. In a valve device, the combination of: a valve housing having a longitudinal bore therein and having a valve seat axially aligned with said bore, said housing having an inlet port communicating with said bore on one side of said valve seat and a discharge port communicating with said bore on the other side of said valve seat, said bore having a cam shoulder formed therein; a valve member axially movable in said bore from a seated position on said valve seat preventing fluid flow from said inlet port to said discharge port to an unseated position permitting fluid flow from said inlet port to said discharge port; plunger means axially movable in said bore to engage said valve member, said plunger means being movable from a retracted position in which said valve member is in said seated position to an operating position in which it has moved said valve member to said unseated position; releasable locking means for normally retaining said plunger means in said retracted position, said locking means comprising a plurality of balls annularly disposed around said plunger means and engaging said cam shoulder when said plunger means is in said retracted position, the engagement of said balls with said shoulder preventing axial movement of said plunger means; means for releasing said locking means, including a movable member adapted to normally prevent inward movement of said balls but movable so as to permit the engagement of said balls with said cam shoulder to force said balls inwardly out of engagement with said shoulder; and means for moving said plunger means from said retracted position to said operating position upon said release of said locking means.

6. In a valve device, the combination of: a valve housing having a longitudinal bore therein and having an inlet port and a discharge port connected by a fluid passage including a valve seat; a movable valve member adapted to seat on said valve seat to prevent fluid flow from said inlet port to said discharge port, and to unseat so as to permit such flow; plunger means axially movable in said bore, one end of said plunger means being operatively connected with said valve member, said plunger means being movable from a retracted position in which said valve member is in said seated position to an operating position in which it has unseated said valve member, the other end of said plunger means being provided with a tubular sleeve; releasable locking means operatively connected between said bore and said sleeve for normally retaining said plunger means in said retracted position; releasing means extending into said sleeve and operatively connected with said locking means for releasing the same upon axial movement of said releasing means; means for axially moving said releasing means; and means for moving said plunger means from said retracted position to said operating position upon release of said locking means.

RODNEY B. CAMPBELL.